No. 850,980. PATENTED APR. 23, 1907.
E. A. STULZ.
BOLT ANCHOR.
APPLICATION FILED JAN. 16, 1906.
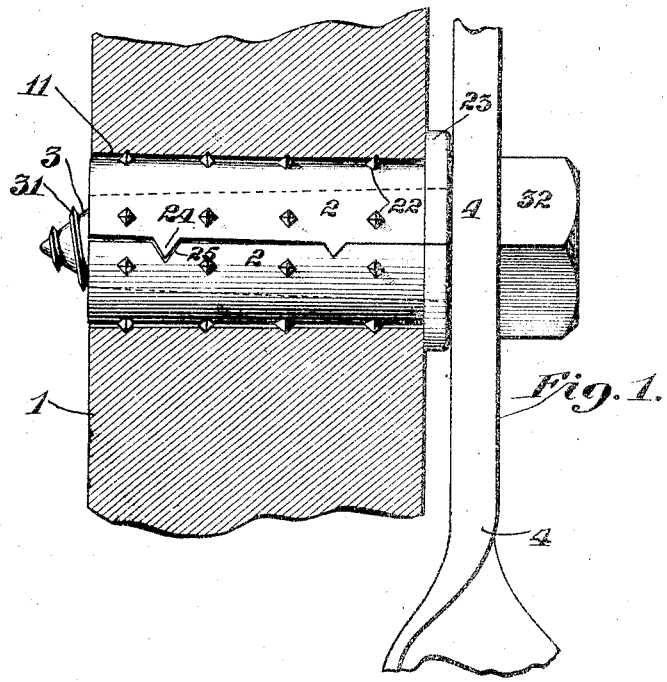
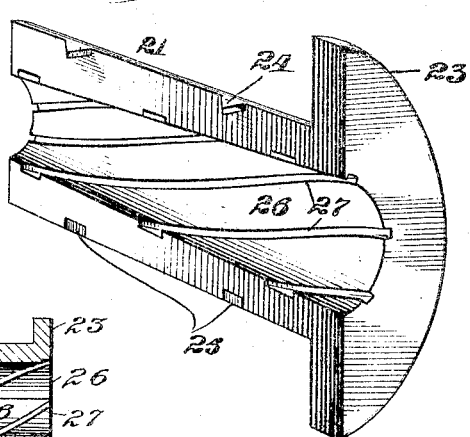
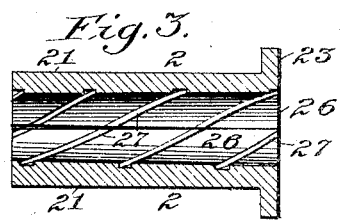
Attest: Inventor:
EDWARD A. STULZ
by Dickerson, Brown, Raegener & Binney
Attys

UNITED STATES PATENT OFFICE.

EDWARD ANTHONY STULZ, OF AVENEL, NEW JERSEY.

BOLT-ANCHOR.

No. 850,980.  Specification of Letters Patent.  Patented April 23, 1907.

Application filed January 16, 1906. Serial No. 296,268.

*To all whom it may concern:*

Be it known that I, EDWARD ANTHONY STULZ, a citizen of the United States, and a resident of Avenel, New Jersey, have invented certain new and useful Improvements in Bolt-Anchors, of which the following is a specification.

My invention relates to bolt-anchors such as are inserted in holes made in walls of stone, brick, or other hard material for the purpose of holding a bolt or screw engaged therein.

The object of the invention is to provide an expansible anchor which shall have a very complete and firm engagement with the thread of the bolt and with the aperture in the wall in which it is placed.

A further object of the invention is to provide the anchor with means by which it is prevented from slipping into or through the aperture in the wall when the bolt is being engaged therein.

Further objects of the invention will appear in the specification and be pointed out in the claims.

In the drawings, Figure 1 shows a bolt-anchor embodying my invention in operative position. Fig. 2 is a perspective view of a section of the bolt-anchor. Fig. 3 is a vertical section through the bolt-anchor shown in Fig. 1.

1 designates a wall in which is formed an aperture 11, slightly tapered toward its rear end.

2 2 designate bolt-anchor sections, shown as two in number, but which may of course be increased in number as desired. As shown, the sections 2 are completely separated from each other; but it is obvious that this separation need only be made at the rear end of the bolt-anchor to provide for its expansion as the bolt 3 is driven therein. Each section 2, as shown, consists of a body portion 21 of semicylindric form, provided with projections 22 for engaging in the sides of the aperture 11, and of a flange or head 23, extending laterally from the body 21 at its forward end. The body 21 is also provided at one side with a plurality of lugs 24, adapted to engage in corresponding seats 25 in the adjacent section. As shown, the two sections are precisely similar, each being provided with lugs 24 at one side and corresponding recesses 25 at the other. The inner face 26 of the section 2 tapers from front to rear, so that when the sections are assembled the bolt-anchor will have a conical bore. The face 26 is traversed by a plurality of grooves 27, similar to those in a rifle-barrel. It will be seen that these are angularly disposed and that their pitch is opposite to that of the thread 31 of the screw or bolt to be engaged therein and in the present instance so as to be approximately at a right angle with said thread. It will be also seen that the grooves 27 in each section are so disposed that when the sections are assembled together the grooves will extend in continuous lines around the bore of the anchor, as clearly shown in Fig. 3. The bore of the anchor may be made only slightly larger than the body diameter of the bolt 3 to be engaged therein, so that the threads 31 will cut deeply into the faces 26 of the anchor-sections, these being preferably made of soft metal.

It is obvious that the "chip" or any metal cut away from the faces 26 of the bolt-anchor sections will find lodgment in the grooves 27 and that these, in addition, make it possible to screw the bolt 3 therein without undue force.

In Fig. 1 of the drawings I have shown the parts assembled, the bolt 3 being entered within the anchor-sections 2, the head 32 of the bolt engaging with a portion of a bracket 4, as shown. Where the wall 1 is hollow or only of sufficient thickness so that the bolt-anchor nearly or quite extends therethrough, it is of great advantage to provide the anchor with the head or flange 23, as shown, to prevent its being forced through the wall when the bolt is engaged therein.

It is obvious that certain mechanical changes may be made in my device without departing from the spirit of the invention and that parts of the device may be useful without others.

What I claim is—

1. An expansible bolt-anchor having its bore traversed by a plurality of grooves pitched angularly from front to rear in a direction more nearly longitudinal than circumferential, for substantially the purposes set forth.

2. In combination with a threaded bolt an expansible bolt-anchor having a conical bore traversed by a plurality of grooves pitched angularly from front to rear in a direction opposite to that to the thread of the bolt.

3. An expansible bolt-anchor having its bore traversed by a plurality of angularly-disposed grooves, and a bolt engageable in said anchor, the grooves on the anchor and the threads of the bolt being greatly inclined to each other.

4. An expansible bolt-anchor composed of a plurality of separate sections together forming a body having a conical bore traversed by a plurality of angularly-disposed grooves, certain of the grooves in each of said sections forming continuations of the grooves in an adjacent section.

5. An expansible bolt-anchor composed of a plurality of separate and similar sections together forming a body having a conical bore traversed by a plurality of angularly-disposed grooves, all of the grooves in each of said sections forming continuations of the grooves in an adjacent section.

In testimony whereof I have signed this specification in the presence of two subscribing witnesses.

EDWARD ANTHONY STULZ.

Witnesses:
J. L. HALPIN,
E. L. TOMLINS.